Nov. 25, 1969  R. G. KRAMER  3,479,812
MASTER CLOCK
Original Filed Feb. 28, 1964  4 Sheets-Sheet 1
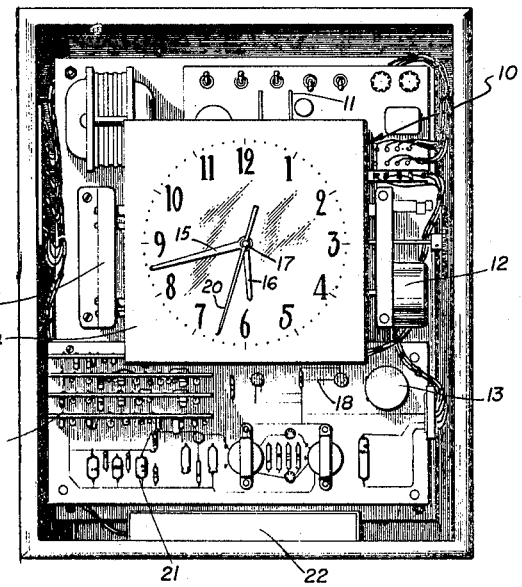
FIG. 1
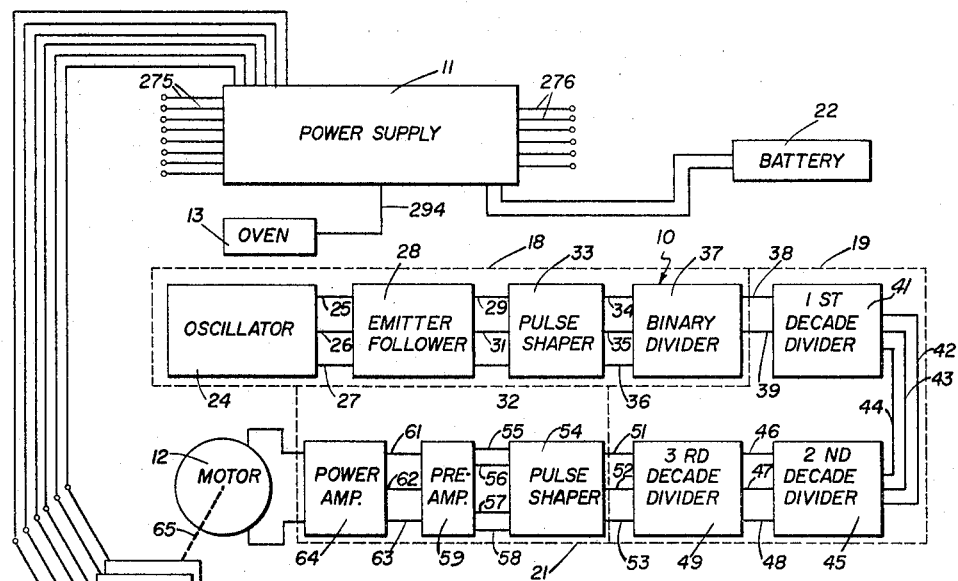
FIG. 2
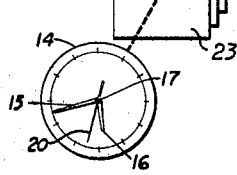
ROGER G. KRAMER
INVENTOR.
BY

ROGER G. KRAMER
INVENTOR.

ROGER G. KRAMER
INVENTOR.

United States Patent Office 3,479,812
Patented Nov. 25, 1969

3,479,812
MASTER CLOCK
Roger G. Kramer, Frederick, Md., assignor to Simplex Time Recorder Company, Gardner, Mass., a corporation of Massachusetts
Continuation of application Ser. No. 348,181, Feb. 28, 1964. This application Dec. 23, 1966, Ser. No. 628,179
Int. Cl. G04c *13/04*
U.S. Cl. 58—25           2 Claims

ABSTRACT OF THE DISCLOSURE

This invention relates to a master clock and, more particularly, to apparatus arranged to serve as a main regulator for a series of secondary clocks or other event-regulating equipment.

CROSS-REFERENCE TO RELATED APPLICATION

This application is a continuation of application Ser. No. 348,181, filed Feb. 28, 1964, now abandoned.

In regulating a series of secondary clocks or of time-oriented equipment, wherein it is desirable to keep all of the clocks and equipment in synchronization, it is common practice to use a master clock. Such a clock, by sending signals to the secondary equipment, checks their time regularly and makes corrections for errors. In all installations, of course, the accuracy of regulation of the secondary equipment is entirely dependent upon the ability of the master clock to maintain accurate time. Although it is possible to check the time against the Naval Observatory radio broadcast station WWV from time to time, it is necessary in a proper master clock to maintain the signal from the master clock in accurate condition in the period of time between such checkings. It is possible for the time indication of a master clock to be non-linear between checkings even though it appears to be accurate when compared from time to time with the most accurate time information. The most common cause for these variations from accurate time keeping are those which are caused by thermal effects, these being particularly noticeable in the case of mechanical clocks, but also affecting the operation of electronic time keepers. Removing the cause of time variations is a very expensive matter, so that inexpensive clocks in the past have been inaccurate; when great accuracy has been desired, it has always been necessary to use expensive timepieces. Although there has been in the past no master clock which is both accurate and inexpensive, even the very expensive clocks which have considerable accuracy are complicated and require frequent repair. These and other difficulties experienced with the prior art devices have been obviated in a novel manner by the present invention.

It is, therefore, an outstanding object of the invention to provide a master clock having a high degree of accuracy.

Another object of this invention is the provision of a master clock which is relatively simple in nature and is capable of operating for long periods of time with a minimum of maintenance.

A further object of the present invention is the provision of a master clock of the electronic type which is substantially free of thermal drift.

It is another object of the instant invention to provide a master clock having apparatus for transmitting signals to secondary equipment, which apparatus is substantially free of wear.

It is a further object of the invention to provide a master clock made up of electrical circuitry designed in modules, which modules may be replaced bodily for rapid repair of the clock.

It is a still further object of the present invention to provide a master clock of considerable accuracy which, nevertheless, is inexpensive to manufacture, and which is capable of a long life of useful service.

It is a still further object of the present invention to provide a master clock making full use of printed circuitry and modular logic units.

Another object of the invention is the provision of a master clock whose basic frequency is a crystal-controlled oscillator whose frequency is free of variation due to thermal effects.

Another object of the invention is the provision of a master clock of high accuracy, which is electronically controlled and which requires no special source of electrical power but operates from conventional alternating current source.

Another object of the invention is the provision of a master clock which continues to operate despite interruptions for large periods of time of its normal alternating current power.

Another object of the invention is the provision of a master clock consisting of a crystal-controlled oscillator feeding into a dividing network, wherein means is provided for preventing the network from representing a load on the oscillator.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 1 is a front elevational view of a master clock embodying the principles of the present invention;

FIG. 2 is a somewhat schematic view of the clock, showing the operative relationship of the parts;

Figures 3, 4:
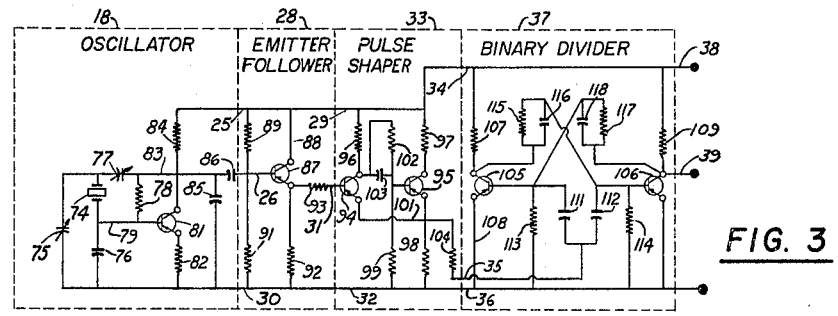
FIG. 3 is an electrical schematic of primary time-regulating components of the clock.
FIG. 4 is an electrical schematic of a dividing network forming a portion of the clock.
Figure 5:
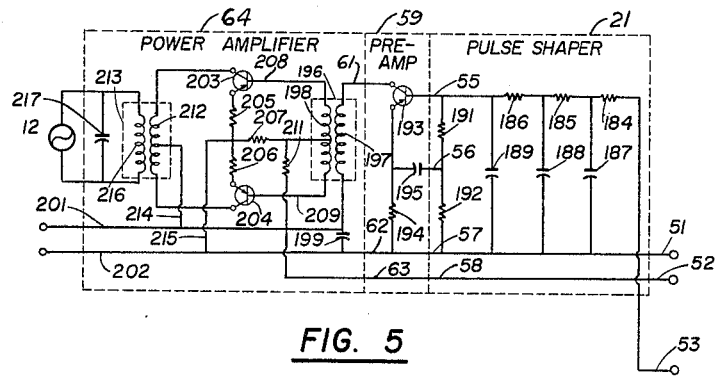
FIG. 5 is an electrical circuit drawing of an amplifying circuit forming part of the clock.

Referring first to FIG. 1, wherein are best shown the general features of the invention, the master clock, indicated generally by the reference numeral 10, is shown as having a power supply 11 and a main drive motor 12. Also evident in FIG. 1 is a temperature-regulating device such as thermostatically-controlled oven 13 in which is housed a crystal, as will be described more fully hereinafter. The clock is provided with an indicating means such as a clock face 14 carrying a minute hand 15, an hour hand 16, and a second hand 20 mounted on a horizontal shaft 17. Mounted adjacent the oven 13 is the primary time-regulating circuit 18, whose details are shown in FIG. 3. This circuit is connected to a dividing network 19 shown as consisting of three printed circuit boards, the details of which are shown in FIG. 4. The output of the divider network is introduced into a circuit 21 whose major function is amplification and whose output is connected to the motor 12. The details of the circuit 21 are shown in FIG. 5, while those of the power supply 11 are shown in FIG. 7. Mounted in the clock under the circuit 21 is a battery 22. Located behind the clock face 14 is a signal-distributing apparatus or timing commutator 23, whose details are of the subject of FIG. 6.

Referring next to FIG. 2, wherein are shown the functional relationships of the various parts of the clock, it can be seen that the primary time-regulating circuit 18 consists of an oscillator 24 connected by lines 25, 26, and 27 to an emitter follower 28. The emitter follower is, in turn, connected by lines 29, 31, and 32 to a pulse shaper 33. The pulse shaper is, in turn, connected through lines 34, 35, and 36 to a binary divider 37. The binary divider is the last element of the primary time-regulating circuit 18 and is connected by lines 38 and 39 to a first decade divider 41 forming part of the dividing network 19. The divider 41 is connected by three lines 42, 43, and 44 to a second decade divider 45. The divider 45 is, in turn, connected through lines 46, 47, and 48 to a third decade divider 49 constituting the final element of the dividing network 19.

The third decade divider 49 and the dividing network 19 are connected by lines 51, 52, and 53 to a pulse shaper 54 constituting the first element of the circuit 21. The output of the pulse shaper is connected by four lines 55, 56, 57, and 58 to a power amplifier 64 whose output is connected to the motor 12.

The motor 12 is mechanically connected by a transmission means 65 to the timing commutator 23, on the one hand, and to the shaft 17 associated with the clock face 14 and the hands 15, 16, and 20. The timing commutator is, in turn connected by six lines 66, 67, 68, 69, 71, and 72 to the power supply 11.

FIG. 3 shows that the primary time-regulating circuit 18 consists of the oscillator 18, the emitter follower 28, the pulse shaper 33, and the binary divider 37. The oscillator is provided with a crystal 74 which resides in the oven 13 and is maintained at a constant temperature. One side of the crystal 74 is connected to one side of a variable capacitor 75, the other side of which is connected to the line 30 which runs through the entire time circuit 18. The other side of the crystal 74 is connected through a fixed capacitor 76 on the line 30. The first side of the crystal 74 being connected to one side of a capacitor 77, while the other side of the capacitor 77 is connected to one side of a resistor 78. A line 79 connects a common point between the crystal 74 and the capacitor 76 to the base of a transistor 81 which is type ASY27. The other side of the resistor 78 is connected to the line 79. The emitter of the transistor 81 is connected through a resistor 82 to the line 28. The collector of the transistor 81 is connected to a line 83, which is also connected to the first side of the resistor 78. The line 83 is also connected to one side of a resistor 84, the other side of which is connected to the line 25 which extends through a major portion of the time circuit 18. Connected between the line 28 and the line 83 is a capacitor 85. A capacitor 86 is connected on one side to the line 83 and on the other side to the line 26 extending into the emitter follower 28. As has been described above, the lines 25, 26, and 28 extend from the oscillator 24 into the emitter follower 28.

The major element of the emitter follower 28 is a type ASY27 transistor 87 whose base is connected directly to the line 26, while its collector is connected by a line 88 to the line 25 which runs entirely through the emitter follower. The line 26 is also connected to the line 25 by a resistor 89 and the line 26 is connected to the line 28 by a resistor 91. The emitter of the transistor 87 is connected through a resistor 92 to the line 28. It is also connected to one side of a resistor 93. The emitter follower 28 is connected to the pulse shaper 33 by a line 29 which is an extension of the line 25 and a line 32 which is an extension of the line 28, as well as a line 31 which is connected on one side to the resistor 93.

The pulse shaper 33 has as its major components two transistors 94 and 95 which are type ASY27. The base of the transistor 94 is connected to the line 31 and its collector is connected through a resistor 96 to the line 29. The collector of the transistor 95 is connected through a resistor 97 to the line 29 and the emitter of the transistor 95 is connected through a resistor 98 to the line 32. The base of the transistor 95 is connected through a resistor 99 to the line 32, while the emitter of the transistor 94 is connected by a line 101 to the emitter of the transistor 95. Connected between the collector of the transistor 94 and the base of the transistor 95 is a resistor 102 and a capacitor 103 connected in parallel. Connecting the pulse shaper 33 to the binary divider 37 are three lines 34, 35, and 36, the line 34 constituting an extension of the line 29 from the pulse shaper, the line 35 being connected to the emitter of the transistor 95 through a resistor 104, and the line 36 constituting an extension of the line 32.

The binary divider 37 is provided with two transistors 105 and 106 both of type ASY27. The collector of the transistor 105 is connected by a resistor 107 to the line 34, while its emitter is connected by a line 108 to the line 36. The collector of the transistor 106 is connected through a resistor 109 to the line 34 and also to the line 39 leading to the decade divider 19. The line 34 is also connected to a line 38 leading to the divider network 19. The emitter of the transistor 106 is connected directly to the line 36. The bases of the two transistors 105 and 106 are connected together through two series capacitors 111 and 112, while the base of the transistor 105 is connected to the line 36 by a resistor 113, and the base of the transistor 106 is connected to the line 36 through a resistor 114. A common point between the capacitors 111 and 112 is connected to the line 35. The collector of the transistor 105 is connected through a resistor 115 and a capacitor 116 connected in parallel to the base of the transistor 106. Similarly, the collector of the transistor 106 is connected through a resistor 117 and a capacitor 118 connected in parallel to the base of the transistor 105. Extending from the binary divider and from the primary time-regulating circuit 18 in general are the leads 38 and 39 connected to the divider network 19 in general and the first decade divider 41 in particular.

The dividing network 19 consists of the first decade divider 41, the second decade divider 45, and the third decade divider 49. The line 38 leading from the binary divider 37 into the first decade divider 41 is directly connected to the line 42 which extends between the first decade divider and the second decade divider. It is directly connected to the line 48 and the line 52 extending between the third decade divider 49 and the pulse shaper 54. The first decade divider is provided with eight transistors, 121, 122, 123, 124, 125, 126, 127, and 128, all of which are type ASY27, these transistors being connected in pairs to form four flip-flop circuits. The transistors 121 and 122 form with their associated resistors and capacitors a flip-flop circuit 129. The transistors 123 and 124 assist in forming a flip-flop circuit 141. The transistors 125 and 126 form a flip-flop circuit 142; and the transistors 127 and 128 form a flip-flop circuit 143. By the expression "flip-flop" is meant a logic circuit consisting of a bistable multi-vibrator. The line 39 entering the first decade divider is connected to a resistor 119 connected into the flip-flop 129. The output of the flip-flop 129 is connected to the input of the flip-flop 141 by a line 144. The output of the flip-flop 141 is connected to the input of the flip-flop 142 by a line 145; and the output of the flip-flop 142 is connected to the input of the flip-flop 143 by a line 146. The collector of the transistor 128 is connected to the second decade divider by the line 44. Similarly, the first decade divider is connected to the second decade divider by the line 43. The collector of the transistor 125 is connected by a line 147 to a diode 148 of the 1N617 type, the other side of which is connected to the base of the transistor 123. The line 147 is also connected through a diode 149 of the 1N617 type to the base of the transistor 121. This arrangement of feedback through the line 147 and the transistors 148 and 149 provides that those pulses arriving at the first decade divider through the line 39 are divided by ten before being transmitted through the line 44 to the second decade divider, rather than being divided by 16 as would be the case if there were no feedback.

With regard to the second decade divider 45, there are three incoming lines 42, 43, and 44 arriving from the first decade divider and there are three outgoing lines 46, 47, and 48 leading from the second decade divider to the third decade divider. The second decade divider is provided with eight transistors 151, 152, 153, 154, 155, 156, 157, and 158. The transistors 151 and 152 form a flip-flop 159, the transistors 153 and 154 form a flip-flop 161, the transistors 155 and 156 form a flip-flop 162, while the transistors 157 and 158 form a flip-flop 163. Feedback is provided to cause the pulses to be divided by 10 rather than by 16 by means of a line 164 leading from the collector of the transistor 155 and not only connected through a diode 165 of the 1N617 type to the base of the transistor 153, but also connected through a diode 166 of the 1N617 type to the base of the transistor 151. The line 46 extends from the collector of the transistor 158 to the third decade divider. The line 48 represents a continuation of the line 38 and 42 and, eventually is connected to the line 52 extending from the third decade divider to the pulse shaper 54. The line 47 constitutes an extension of the line 51 entering the first decade divider and merging with the line 43; it eventually is connected to the line 51 leading from the third decade divider to the pulse shaper 54.

The third decade divider is made up of eight transistors 167, 168, 169, 171, 172, 173, 174, and 175. The transistors 167 and 168 form with their associated resistors and capacitors a flip-flop 176, while the transistors 169 and 171 similarly form the nucleus of a flip-flop 177. The transistors 172 and 173 form a flip-flop 178 and the transistors 174 and 175 form a flip-flop 179. The collector of the transistor 172 is connected through the line 181 and through a diode 182 of the 1N617 type to the base of the transistor 169, while the line 181 is also connected through a diode 183 of the 1N617 type to the base of the transistor 167. The collector of the transistor 175 is connected to the line 53 leading to the pulse shaper 21.

Referring to FIG. 5, the circuit 21 is shown as having input lines 51, 52, and 53 originating in the dividing network 19. The line 53 is connected to one side of a resistor 184 which is connected to a resistor 185 which, in turn, is connected to a resistor 186. A common point between the resistor 184 and the resistor 185 is connected through a capacitor 187 to the line 51. Similarly, a common point between the resistors 185 and 186 is connected through a capacitor 188 to the line 51. Finally, the side of the resistor 186 opposite the side which is connected to the resistor 185 is connected by a capacitor 189 to the line 51. Across the capacitor 189 are connected two resistors 191 and 192 connected in a series with one another, the said other side of the resistor 186 and the common point with it of the capacitor 189 (as well as the side of the resistor 191 which is not connected to the side of the resistor 192) are connected by a line 55 to the pre-amplifier 59. The common point between the resistors 191 and 192 is connected to the pre-amplifier by a line 56, while the side of the resistor 192 which is connected to the line 51 is connected by a line 57 to the pre-amplifier. The extension of the line 52 is given a reference numeral 58 for clarity of presentation and passes through the pre-amplifier without taking part in its action and eventually is connected into the power amplifier 64, as will be explained.

The pre-amplifier 59 contains a transistor 193 of the 2N2431 type and its base is connected to the line 55 arriving from the pulse shaper. The emitter of this transistor is connected through a resistor 194 to the line 57 and the emitter is also connected through a capacitor 195 to the line 56. The collector of the transistor is connected by a line 61 to the power amplifier and the line 57 is connected by a line 62 to the power amplifier, while the line 58 is shown as the line 63 leading also to the power amplifier.

The power amplifier 64 contains a transformer 196 having a primary coil 197 and a secondary coil 198. One side of the primary coil is connected to the line 61 which, it will be remembered, was connected to the collector of the transistor 193 of the pre-amplifier 59. The other side of the primary coil 197 is connected through a capacitor 199 to the line 62. The side of the capacitor 199 which is connected to the end of the coil 197 is connected by a line 201 to a source of —12 volt D.C. electricity, while the other side of the capacitor is connected by a line 202 to a zero voltage or ground source. Connected as part of the power amplifier are two transistors 203 and 204 which are connected in push-pull to form the major amplifying components. The emitters of the transistors are connected by a risistor 205 and a resistor 206 connected in series; the common point between them is connected by a resistor 207 to a center tap of the secondary coil 198 of the transformer. One side of this coil is connected by a line 208 to the base of the transistor 203, while the other end is connected by a line 209 to the base of the transistor 204. A point between the resistor 207 and the midtap of the coil 198 is connected by a resistor 211 to the line 201 and also to the line 63 which enters the power amplifier from the preceding circuits. The collectors of the transistors 203 and 204 are connected to opposite ends of a primary coil 212 of a transformer 213, the mid-tap of this coil being connected by a line 214 to the line 201. The common point between the resistors 205 and 206 is also connected by a line 215 to the line 202. The transformer 213 has a secondary coil 216 and across this coil is connected a capacitor 217 and the motor 12.

Figure 6:
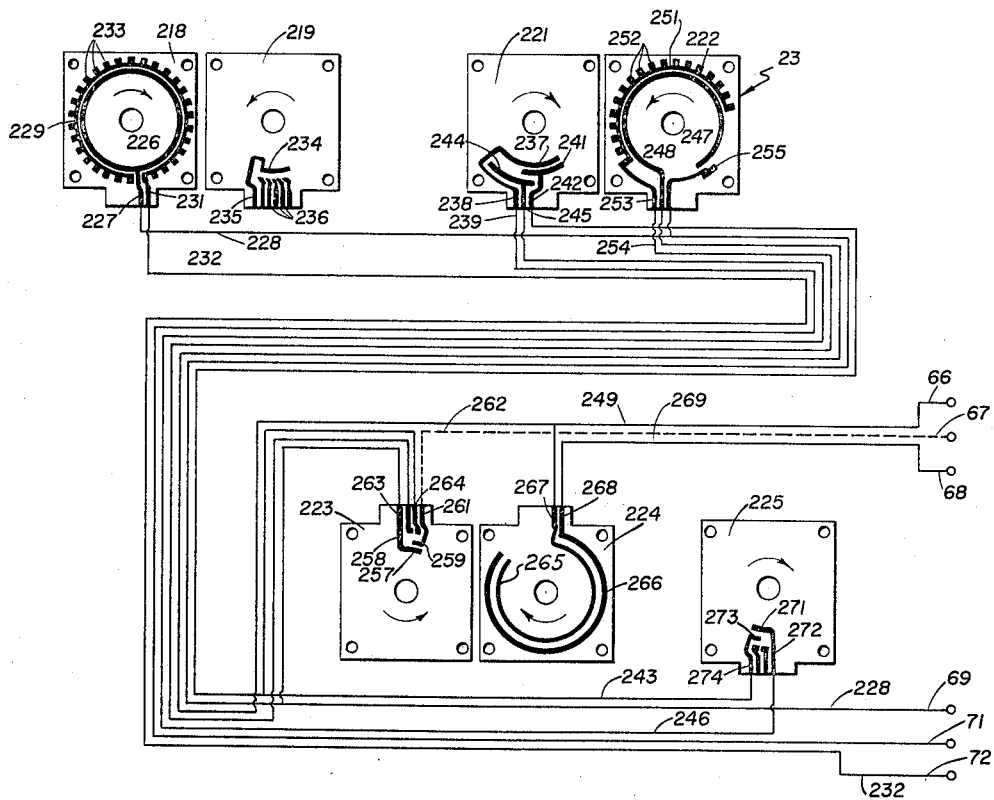
FIG. 6 is a somewhat schematic view of certain signal-transmitting equipment including a timing commutator forming a portion of the clock.
Figure 7:
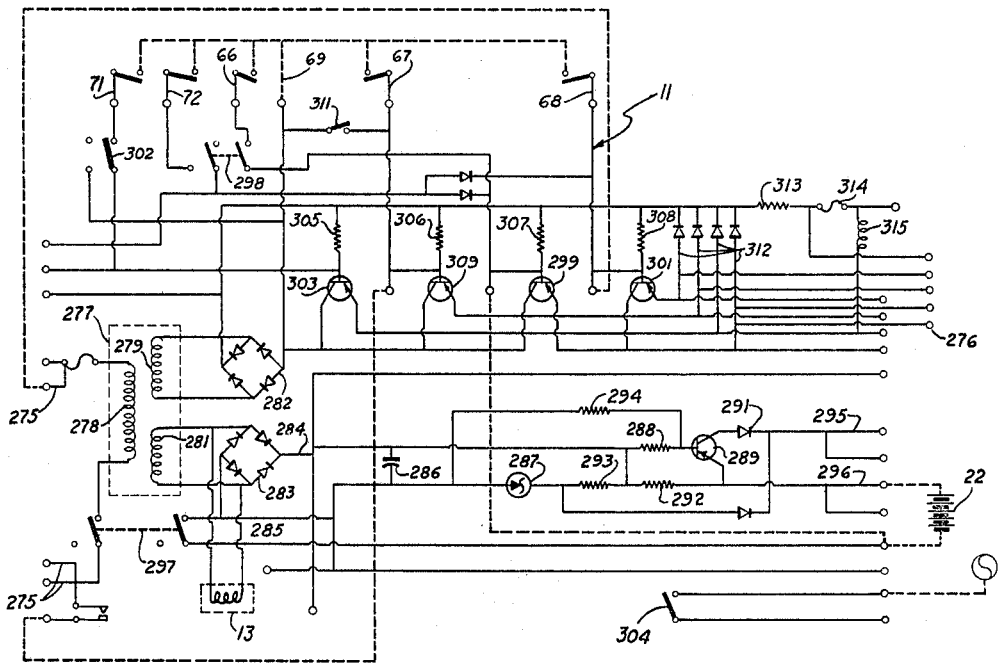
FIG. 7 is an electrical circuit drawing of a power supply.

FIG. 6 shows the details of the timing commutator 23. It consists principally of seven printed circuits 218, 219, 221, 222, 223, 224, and 225. Each of these printed circuits has an aperture passing through its center with a shaft passing through the aperture and carrying a contact finger which sweeps over the conducting paths carried on the printed circuit for the purpose of making switching contacts. The transmission 65 leading from the motor 12 to the timing commutator and to the clock face 14 contains gearing in the usual way, so that the shaft which passes through the printed circuits 218, 219, 221, and 222 operates at 1 r.p.m., while the shaft which passes through the printed circuits 223 and 224 has a speed of 1 revolution per hour and the shaft which passes through the printed circuit 225 has a speed of 1 revolution in each 12 hour period. The printed circuit 218 contains a conductive path 226 which is circular in shape and concentric with the central aperture and which has a lead 227 extending away from it and connected to a line 228. Out side of and concentric with this circle is a conductive path 229 which is generally an open circle from one end of which extends a lead 231 connected to a line 232. Extending outwardly of the circle are spaced lugs 233 adapted to be contacted by the switching finger which, as the shaft rotates, makes connections between the inner path 226 and the lugs 233. The printed circuit 219 is provided with a short circular segmental path 234 from one end of which extends a radial lead 235. A series of leads 236 are arranged with their ends lying in a circular segment concentric with the path 234 and co-extensive therewith. The printed circuit 221 has a circular segmental path 237 from one end of which extends a lead 238 connected to a line 239. It also has a shorter circular segmental path 241 which subtends about ½ the amount of the circle that the path 237 subtends and is provided with a lead 242 connected to a line 243. It is coextensive with the end of the path 237 which is away from the lead 238. A third path 244 is formed on the surface of the printed circuit 221 and it also contains a circular segmental portion which is concentric with the paths 237 and 241, is outside of them, and is co-extensive with a portion of the path 237 close to the lead 238 and with a portion only of the path 241. This path 244 is provided with a lead 245 which is connected to a line 246. The printed circuit 222 is provided with an open circular path 247 which is concentric with the aperture and which is provided with a radial lead 248 which is connected to a line 249. Concentric with the path 247 and outside of it is a path 251 having lugs 252 and a lead 253 which is connected to a line 254. Also located on the printed circuit 222 is a short contact path 255 which is co-extensive with the outermost portion of the path 247 and which is provided with a lead 256 connected to the line 228.

The printed circuit 223 is provided with a short circular segmental contact path 257 which is provided with a radial lead 258 which is connected to the line 228. It is also provided with a short circular path 259 which is coextensive with a portion of the path 257 and which has a lead 261 connected to a line 262. Also forming part of the printed circuit 233 are two leads 263 and 264 which are connected, respectively, to the lines 254 and 243. The printed circuit 224 carries two concentric open circular paths 265 and 266 each provided, respectively, with leads 267 and 268. The lead 267 is connected to the line 249 while the lead 268 is connected to the line 269 while the lead 268 is connected to a line 269. Lastly, the printed circuit 225 (which is associated with the 1-revolution-per-12-hour shaft) has a short circuit segmental path 271 having a lead 272 connected to the line 246. It also has a short segmental path 273 which is coextensive with the outer portion of the path 271 and has a lead 274 connected to the line 243.

FIG. 7 shows the details of the power supply 11. Extending from this circuit are the lines 66, 67, 68, 69, 71, and 72 which are connected to the corresponding lines of the timing commutator 23. Extending from one side is a number of leads 275, while from the other side is a number of leads 276 adapted to be connected to the apparatus to be controlled, such as secondary clocks and the like. The power supply is provided with a transformer 277 having a primary coil 278 which is connected to a source of 120 volt A.C. electricity. The end of a secondary coil 279 is connected to a rectifier network 282 while the ends of another secondary coil 281 are connected to similar rectifier network 283. Extending from the output corners of the rectifier network 283 are two lines 284 and 285, across which is connected a capacitor 286. In the line 285 is located a Zener diode 287. The line 284 is connected through a resistor 288 to the base of a transistor 289. The collector of the transistor is connected through a diode 291 of the 1N645 type and from there to an output line 295. The emitter of the transistor 289 is not only connected to one side of the battery 22 by a line 296 but it is also connected through a resistor 292 to the side of the resistor 288 which is not connected to the transistor 289. This same side of the resistor 292 is connected through a resistor 293 to one side of the Zener diode 287. The other side of the Zener diode 287 is connected by a resistor 294 and also to the base of the transistor 289. The common point between the Zener diode 287 and the resistor is connected through a type 1N645 diode to the line 295.

The operation of the invention will now be readily understood in view of the above description. The master clock 10 is a reliable timepiece having maximum accuracy and few sources of trouble. It has as few moving parts as is feasible and is provided with solid state devices accomplishing nearly all the electrical functions. The timekeeping accuracy of the clock is dependent upon the crystal-controlled oscillator 18 (FIG. 3) and its crystal 74, the oscillator operating at 100 kilocycles. The crystal is kept at a constant temperature by the thermostatically-controlled oven 13. The 100,000 cycle per second signal generated by the oscillator is coupled to the emitter follower 28 which has the effect of isolating the load between the oscillator 24 and the pulse shaper 33. The signal passes through the emitter follower to the pulse shaper 33 which is a so-called "Schmitt trigger" and which, because of its nature, forms output pulses which are square in shape. The pulses are then fed through the dividing network consisting not only of the binary divider 37 which divides the number of pulses in two, but the divider network 19 which reduces it by a thousand, so that the net output of the divider network 19 is a 50-cycle signal reduced to that signal from 100,000 by the dividing by 2,000. The binary divider 37 divides the frequency in two and each of the decade dividers 45 and 49 divide it by 10. Although each decade divider consists of four flip-flops which would normally divide the number of pulses by 16, the feedback provided reduces the number of pulses by six and thus cut pulses to 10 for each decade divider. These are all square pulses and they are fed into the pulse shaper 54 which changes them to a sine wave shape. Then they are introduced into the pre-amplifier 59 and finally amplified in the power amplifier 64 before being passed to the motor 12. The motor is a 50-cycle, 1 r.p.m., synchronous motor whose speed is dependent wholly upon frequency. If the frequency of the oscillator 24 deviates by 0.1 cycle, the error at 50 cycles is .00005 cycle, of approximately 2.5 seconds per month. The synchronous motor drives the shaft 17 of the clock face 14, so that the hands 15, 16, and 20 show the correct time. At the same time, it drives through the transmission 65 to operate the timing commutator 23. The timing commutator controls the correction pulses to the appropriate controlled apparatus or secondary clocks. These commutators are intended for long life at relatively low loads and they only supply bias voltage to associated power transistors which actually carry the load of the system. Standby power is provided by the battery 22 which is a 14-ampere manganese alkaline battery that has a 5-year shelf life and can provide power for 36 hours continuously. To keep this battery at maximum readiness it is constantly charged at the rate of 12 microamps. To prevent deterioration of the battery it is composed of welded stainless steel cells that will not rust or leak.

The power supply 11 has two functions. The first is to supply regulated voltage and standby power to operate the timekeeping section of the master clock. The second is to provide the power necessary to operate and correct the secondary systems which are connected to the master clock. The transformer 277 has the two secondary windings 279 and 281. One supplies the power to the rectifier 282 for system power and the other supplies power to the rectifier 283 for the master clock drive. The transformer 277 is such that 15 volts appears on the output secondary coil 281 and this is full wave rectified by the rectifier 283. The crystal oven heater is connected to both ends of the transformer winding 281, respectively. The capacitor 286 filters out any line frequency ripple and the Zener diode 287 and the resistor 293 regulate the voltage. If the voltage is higher than 12 volts (the Zener voltage), it will pass more current and cause a larger voltage drop across the resistor 293. This is the reason 15 volts is used as a supply voltage, i.e., in order that the line voltage fluctuations will not cause the supply voltage to drop below 12 volts. The regulated 12 volts is fed to the master clock drive through the diode 291 to the line 295. The standby battery 22 is connected through a line 296 to the emitter of the transistor 289. The base resistor 288 which, in this case, is 10 ohms, supplies enough positive bias to overcome the negative biasing 4.7K ohm resistor 294 and hold the transistor in "off" condition. The small current drain on the battery created by the 4.7K ohm resistor 294 is compensated for by a 220K ohm resistor 292 which charges the battery at 12 microamps above its drain rate. In the case of power failure, the positive bias is removed, the transistor is triggered into conduction by the 4.7K ohm resistor 294 from the minus side of the battery, and the transistor 289 will conduct and feed power to the line 295 through the diode 291. Upon resumption of power, the positive voltage will cut the transistor 289 off by means of the 10 ohm resistor 288. A switch 297 disconnects the battery and power simultaneously in order that all power may be removed from the system. A switch 298 controls the impulse systems and in the "on" position, it connects the base of a transistor 299 to its control commutators. In the "off" position, this circuit is open and in the "advance" position the base of the transistors 299 and 301 are connected to the rapid advance portion of the commutator. A switch 302 in like manner controls a clutch magnet correction system by connecting and disconnecting the base of a transistor 303 to the control commutators. In the momentary position a negative bias is put on the base of the transistor 303 as long as the switch is held in the depressed position. A switch 304 merely disconnects the commutator drive motor from its source of power generated in the drive section of the master clock. A series of 1,000 ohm 1 watt resistors 305, 306, 307, and 308 bias the power transistors 303, 299, and 301 as well as a transistor 309 until negative bias is applied to the base by means of the control commutators or manual switches. A switch 311 puts bias on the transistor 309 to manually control the motor generator start. A series of diodes 312 are transient suppression diodes to protect the transistors from spikes generated by de-energization of coils. A 1 ohm, 10 watt resistor 313 limits the collector current of the transistors so that even a direct short on the line will blow a 3 amp fuse 314 before damaging the transistors. A relay 315 and its associated contact merely transform the 24-volt D.C. pulses generated by the transistor 303 into 115 volt A.C. for use on both electronic and three-wire synchronous systems.

The timing commutator 23 of the master clock is designed for maximum life and has the self-cleaning action of continuously wiping contact fingers. The contacts ride on the printed circuits in which the contact material is flush with the rest of the surface and this minimizes the wear on the brushes by eliminating the rise and fall action that they would otherwise experience as they make and break. The wiper brushes are made from a precious metal that has excellent wear and electrical characteristics. The commutator switches are printed circuit contacts etched on a glass epoxy laminate. The contact surfaces are plated with .0005 inch of nickle under a second plated surface of .00005 rhodium. Although the printed circuits 218 and 219 have been described as being separate printed circuits, actually they are printed on the back sides of the printed circuits 221 and 222, respectively, so that the rotation of the brushes on the contact paths is in the manner shown in arrows. In a similar way, the printed circuits 223 and 224 are on opposite sides of the same plate, while the printed circuit 225 is on one side only of its plate. These commutator switches accomplish the timing to control a clock system of one of two basic types, i.e., impulse on the one hand, or the synchronous, electronic, and supra audio. When the commutation is used with the impulse type of secondary control, pulses of two-second duration appear on line 66 once every minute to advance the secondary clocks. At the 59th minute the transfer contacts in the secondaries switch to the line 68 and, if the clocks are fast, they will remain there until the 60th minute, at which time the first pulse will be on the lines 66 and 68 to start the clocks. If the clocks are slow, rapid pulses on the line 66 from the master will advance them (up to 17 minutes) until they switch to the line 68. All of this is accomplished by the transistors 299 and 301 in the power supply 11. If negative bias is applied to the base of the transistor 299, it will conduct and place voltage on the line 66. If negative bias is put on both transistors 299 and 301, they will both conduct and voltage will be on both lines 66 and 68. When the negative bias is removed, the plus biasing resistor will return the transistor to the non-conducting state.

Referring to FIG. 6, negative voltage is fed from the line 69 to the two-second contact on the printed circuit 222 which is shorted to the common inner circle from the 58 second time to the 60 second time once every minute. This contact is connected through the line 66 to the base of the transistor 299 of the power supply. It is also connected to the printed circuit 224 which will put negative bias on the transistor 301 at the same time from the 59 minute and 50 second point to the 49 minute and 50 second point. At the 58 minute and 50 second point negative bias is fed from the inner segment of the printed circuit 223 to the last outer segment to the outer fast impulse segments on the printed circuit 222. Thus, at the 59 minute and 10 second point rapid pulses will be fed to the inner segment of the printed circuit 222 to the base of the transistor 299 only, since printed circuit 224 is now open. At the 59 minute and 45 second point the rapid pulses will cease and 5 seconds later the contact on printed circuit 223 will open and remove negative voltage from the rapid contact segment of printed circuit 222. At the same time this contact opens printed circuit 224, closes 255 and the next two-second impulse will go to both transistors 299 and 301 from the 59 minute and 58 second point to the 0 minute and 0 second point. This completes the correction cycle of the impulse system. The printed circuit 218 is used as a manual rapid advance and continuously feeds one second pulses to the "advance" switch in the power supply. This (when closed) is diode-coupled to the base of both transistors 299 and 301.

So far as synchronous, electronic and super audio systems are concerned, they all require identical timing pulses and will, therefore, be controlled by the same transistor and commutators. The transistor 303 in the power supply accomplishes all necessary functions of these systems by keying relay 315 (transmitter relay, or super audio keying relay). To initiate hourly correction, this relay must be keyed for 8 seconds commencing on the 54th second of the 57th minute of each hour. To initiate a 12 hour correction, this relay must be keyed for 14 seconds at the 5 hour, 57 minute and 54 second point, a.m. and p.m. The inner commutator segment of the printed circuit 221 is connected through the line 71 to the base of the transistor 303 and receives its negative voltage once an hour by means of the 54 minute, 54 second to .02 second contact on the printed circuit 221; this is in series with the 57 minute, 35 second to 58 minute, 20 second contact of printed circuit 223 whose inner segment is connected to the negative line 69. The printed circuit 225 also receives its voltage from printed circuit 223 and, to give a 12-hour correction at 6 a.m. and 6 p.m., feeds the 00 second to 08 second segment of the printed circuit 221 for an additional 6 seconds (2 seconds overlap). The 56 minute 00 second to 58 minute 20 seconds contact on printed circiut 223 is connected through line 67 to the transistor 309 in the power supply and used to energize the starting relay for motor generator units when they are used.

What is claimed as new and desired to secure by Letters Patent is:

1. A master clock, comprising
   (a) an oscillator containing a control crystal and emitting an alternating current signal,
   (b) an oven maintaining the crystal at a constant temperature,
   (c) an emitter follower receiving the signal from the oscillator,
   (d) a pulse shaper receiving the signal from the emitter follower,
   (e) a binary divider receiving the signal from the pulse shaper,
   (f) a series of decade dividers receiving the signal from the binary divider and reducing the frequency by substantial amounts,
   (g) an amplifier serving to increase the power of the output signal from the divider, (h) a synchronous clock receiving the output signal from the amplifier, the clock including a motor and clock hands rotated by the motor, and (i) a timing commutator consisting of a series of fixed printed circuits connected to a power supply and a rotatable shaft driven by the said motor and carrying contact fingers slidable over the circuits.

2. A master clock, comprising (a) a oscillator containing a control crystal and emitting an alternating current signal, (b) an oven maintaining the crystal at a constant temperature, (c) an emitter follower receiving the signal from the oscillator, (d) a pulse shaper receiving the signal from the emitter follower, (e) a binary divider receiving the signal from the pulse shaper, (f) a series of decade dividers receiving the signal from the binary divider and reducing the frequency by substantial amounts, (g) an amplifier serving to increase the power of the output signal from the divider, (h) a synchronous clock receiving the output signal from the amplifier, the clock including a motor and clock hands rotated by the motor, (i) a normal power supply operable from an alternating current source, (j) an auxiliary battery power supply wherein means is provided in normal operation to maintain the battery power supply in charged condition, and (k) a timing commutator consisting of a series of fixed printed circuits connected to the said power supplies and a rotatable shaft driven by the motor and carrying contact fingers slidable over the circuits.

References Cited
UNITED STATES PATENTS

| | | | |
|---|---|---|---|
| 2,970,226 | 1/1961 | Skelton et al. | 58—23 |
| 2,994,184 | 8/1961 | Stout | 58—24 |

RICHARD B. WILKINSON, Primary Examiner

EDITH C. SIMMONS, Assistant Examiner

U.S. Cl. X.R.

58—23